INVENTOR
MICHAEL WENGRYN
BY Ostrolenk, Faber, Gerb & Soffen
ATTORNEYS

INVENTOR.
MICHAEL WENGRYN
BY Ostrolenk, Faber, Gerb & Soffen
ATTORNEYS

United States Patent Office 2,885,619
Patented May 5, 1959

2,885,619

TRANSISTOR DRIVEN MAGNETIC AMPLIFIER

Michael Wengryn, Bellerose, N.Y., assignor to Kollsman Instrument Corporation, Elmhurst, N.Y., a corporation of New York Application November 7, 1956, Serial No. 620,901
5 Claims. (Cl. 318—207)

My invention relates to a transistor driven magnetic amplifier having simplified coupling between the transistor and magnetic amplifier stages and further including novel temperature compensating means.

More specifically, I provide a transistor amplifier wherein the collector circuit is connected to directly energize the control windings of the first and second core of a magnetic amplifier device.

The magnetic amplifier is so constructed that when the input signal to the transistor amplifier is at a first phase relationship, the magnetic amplifier fundamental frequency output will have a magnitude which is determined by the excursion of the input signal from said predetermined amount, and the phase of the fundamental component of the magnetic amplifier output will have a first phase relationship with respect to the phase of the magnetic amplifier input power.

If, however, the input signal to the transistor amplifier is at a second phase relationship, then the magnetic amplifier output will have a magnitude once again determined by the excursion of the input signal from the said predetermined amount, and the phase relationship of the fundamental component of the magnetic amplifier will have a second phase relationship with respect to the input power of the magnetic amplifier.

My novel transistor driven magnetic amplifier would have application to many amplification applications and is particularly well adapted for use in servo systems where the servo system error signal is applied to the input of the transistor amplifier, while the magnetic amplifier output is utilized to drive a servo motor of the type in which torque appears only with the application of the fundamental frequency component of the operating power.

By way of example, a two phase induction servo motor having a center tapped control winding and a conventional single fixed phase winding could be used. Each half section of the control winding is energized from a portion of the magnetic amplifier output so that the first half portion is energized during a first half cycle, and the second half portion is energized during a second half cycle.

The energization of this tapped winding is then such that an unbalance between the energization of the two winding halves due to an input signal at the transistor amplifier will produce a fundamental component of the input frequency to thereby apply a torque to the motor rotor. The polarity of the input signal will determine the phasing of the fundamental frequency component with respect to the phase energization of the single fixed phase winding to thereby determine the direction of rotation of the motor.

Thus, when the input signal to the transistor amplifier is at a first phase relationship, the servo motor will be energized for rotation in a first direction, while an input signal which is at a second phase relationship will cause motor rotation in an opposite direction.

As is well known, transistor amplifiers and magnetic amplifiers assume different operating characteristics in response to a changing ambient temperature.

It is further well known to compensate the transistor amplifier for operation under varying temperature conditions by providing a temperature responsive element in the emitter-base circuit of the transistor.

Thus with an increase in temperature which would normally lead to increase in the collector circuit current, the temperature responsive element operates to change emitter-base bias to decrease the collector current to some predetermined value.

In the system of my novel invention, however, it is not sufficient to merely compensate for temperature variations in the transistor circuit, but it is necessary to go beyond this type of compensation because of temperature variations in the operating characteristics of the magnetic amplifier.

This is necessary since the coercive force of the magnetic cores used in the magnetic amplifier tends to reduce as the temperature is increased. Thus, even though the same collector current operates the magnetic amplifier control winding throughout a given temperature range, the magnetic cores will execute differing flux changes for varying temperature conditions since the initial magnetization due to the control current varies with temperature.

I have found, however, that by constructing the normally used temperature responsive biasing means for the transistor circuit to over-compensate for the transistor collector current, I can compensate for the change of the magnetic amplifier characteristic and thereby provide an overall amplifying unit whose operating characteristics are substantially constant over a wide temperature range. That is, I cause the collector current to vary (due to temperature variations) in a manner which will maintain a constant initial magnetization in the magnetic amplifier cores.

By way of example, when the temperature increases, my novel transistor compensating means will over-compensate for the normal increase in collector current so as to decrease the collector current below its normally operating value. This decreased collector current, however, will be appropriate for the variation in the magnetic amplifier characteristic (decreased coercive force) with the increased temperature so that the overall operation of the transistor driven magnetic amplifier will be constant.

In a similar manner, the collector current will be increased above its normal value when the temperature decreases to thereby supply the increased biasing current for the magnetic amplifier which is required at this lower temperature to maintain a constant initial magnetization.

It is to be noted that my novel transistor driven magnetic amplifier provides an extremely simple circuit which eliminates the heretofore required coupling transformers and condensers for coupling the transistor amplifier and magnetic amplifier as well as providing for temperature compensation of the magnetic core material.

Furthermore, when used in a servo system, small perturbations in collector current will merely alter the quiescent motor current rather than create a fundamental torque producing component in the magnetic amplifier output. Therefore, there is no absolute stabilization required for the transistor collector current even though the unit is operating in a servo system which requires an exceptionally small stand-off error.

Accordingly, the primary object of this invention is to provide a novel transistor driven magnetic amplifier.

Another object of this invention is to provide through a novel method for coupling a transistor amplifier stage to a magnetic amplifier.

Another object of this invention is to provide a novel coupling for a transistor and magnetic amplifier which eliminates the need of coupling transformers or condensers.

A still further object of this invention is a novel transistor driven magnetic amplifier for the control of a servomotor.

Another object of this invention is to provide a novel transistor driven magnetic amplifier wherein the magnetic amplifier output contains a fundamental frequency component having a magnitude and phase which are dependent upon the excursion of the input signal from a predetermined amount and the polarity of the input signal respectively.

Another important object of this invention is to provide novel temperature compensating means for transistor driven magnetic amplifiers.

A still further object of this invention is to provide temperature compensating means for over-controlling the collector current of a transistor amplifier whereby variations in a coupled magnetic amplifier will be accurately compensated.

These and other objects of my invention will become apparent from the following description when taken in conjunction with the drawings in which.

Figure 1:
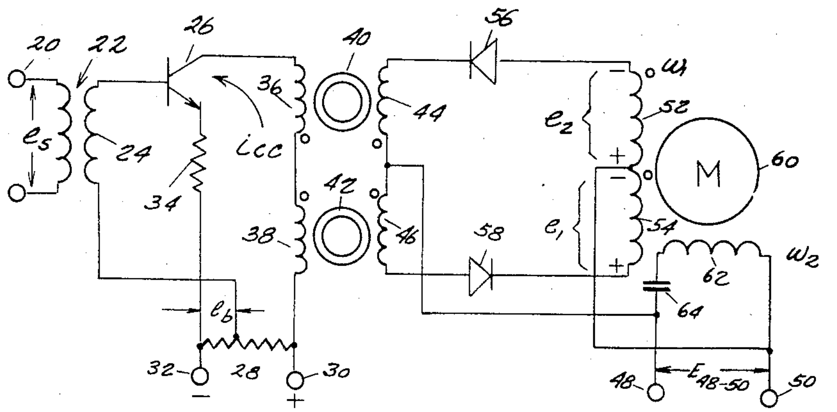
Figure 1 shows a circuit diagram of my novel transistor driven magnetic amplifier when utilized for the control of a servomotor.
Figures 2, 2A, 2B, 4:
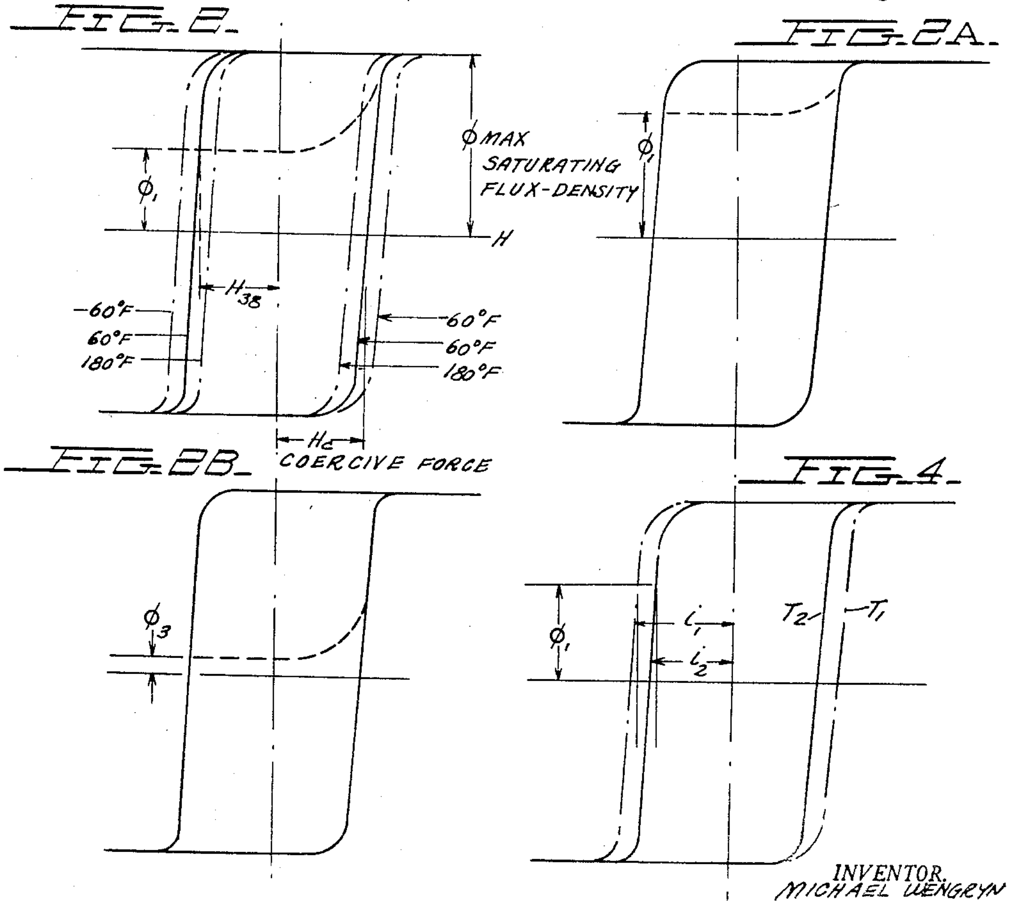
Figure 2 shows the hysteresis characteristic of the magnetic cores of the magnetic amplifier of Figure 1.

Figures 2–*a* and 2–*b* illustrate the operation of the cores of the magnetic amplifier of Figure 1.

Figures 3–*a* through 3–*g* show voltage characteristics plotted as a function of time on a common time scale for the explanation of the operation for the circuit of Figure 1.

Figure 4 illustrates the manner in which my novel temperature compensating means adjusts the operation of the magnetic amplifier.

Referring now to Figure 1, an input signal $e_s$ is applied across primary winding 20 of a signal input transformer 22 which has a secondary winding 24.

Secondary winding 24 is connected in the base-emitter circuit of transistor 26, and its output is superimposed on the biasing voltage $e_b$ which is taken off the potentiometer 28 which is energized from a D.-C. voltage at the terminals 30—32.

It is to be noted that although the signal is introduced in the transistor circuit by the coupling transformer 22, that the signal could be applied in any desired manner.

Thus, the transistor emitter base bias voltage is established by the voltage drop $e_b$ across resistor 28 and the superimposed signal voltage of winding 24, the emitter base bias current being controlled by these voltages in conjunction with the resistance of resistor 34.

The collector circuit of transistor 26 includes control windings 36 and 38 of cores 40 and 42, respectively, of the magnetic amplifier to be described hereinafter.

Each of the cores 40 and 42 is provided with the output windings 44 and 46, respectively, which are energized from an A.C. source which includes terminals 48 and 50.

The magnetic amplifier output circuit is comprised of winding portions 52 and 54 which are merely portions of a center tapped winding above and below the center tap, respectively, each of windings 52 and 54 being energized through diodes 56 and 58, respectively.

Windings 52 and 54 are more specifically portions of a center tapped control winding of the two phase induction servomotor 60, this motor having a further conventional single fixed phase winding 62.

Winding 62 receives quadrature phase excitation through the phase splitting capacitor 64 whereby the appearance of a fundamental frequency component across winding portions 52 and 54 having a first phase relationship with respect to the energization of winding 62 will cause rotation of motor 60 in a first direction, while energization of windings 52 and 54 by the fundamental frequency component having an opposite phase relationship for a second phase relationship with respect to winding 62 will cause rotation of motor 60 in an opposite direction.

The operation of the circuit of Figure 1 may now be considered in conjunction with the characteristic curves of Figures 2 and 3.

In order to simplify the analysis of the circuit operation, the following assumptions will be made:

(1) Cores 40 and 42 possess ideal hysteresis characteristics as seen in Figure 2.

(2) Diodes 56 and 58 present zero resistance in a forward direction and infinite resistance in the reverse direction.

(3) Resistive voltage drops in the windings of cores 40 and 42 are zero.

(4) All reset conditions are determined solely by the quiescent collector current.

(5) The potential of terminal 48 is just passing through zero in a positive direction.

When the potential of terminal 48 passes through zero in a positive direction, the diode 58 will conduct current in its forward direction whereby the full A.C. voltage $E_{48-50}$ across terminals 48 and 50 will be applied across winding 46 since at this point, as is seen in Figure 2, the core is unsaturated and is at an initial flux density $\phi_1$.

The flux of core 42 is set at the value $\phi_1$ by the quiescent current of the collector circuit of transistor 26 flowing through the control winding 38 during the previous half cycle, this being shown in Figure 2 as $H_{38}$.

Thus, the voltage of the A.C. source appears across winding 46 until the core 42 has its flux changed to a saturation value.

Beyond the saturation value no additional flux change occurs and winding 46 is, in effect, short circuited whereby the potential $e_1$ of terminals 48 and 50 falls across winding portion 54 of the motor control winding.

On the following half cycle the same conditions prevail across winding 44 of core 40 where the voltage $e_2$ falls across winding portion 52 after saturation of core 40.

These voltage conditions may be clearly seen in Figures 3–*a*, 3–*b* and 3–*c*, wherein Figure 3–*a* shows the voltage $E_{48-50}$ which is the voltage across terminals 48 and 50 plotted as a function of time, while Figure 3–*b* shows the voltage $e_1$ across winding 54 during a first half cycle and the voltage $e_2$ across winding 52 during the second half cycle plotted on the same time scale as that of Figure 3–*b*.

Figure 3–*c* then shows the addition of voltage $e_1$ and $e_2$ across windings 54 and 52 respectively as seen by the motor 60.

It is obvious that the wave form shown in Figure 3–*c* will not produce a motor torque since it contains no fundamental component of the frequency required for motor energization while the harmonic components and the D.-C. components contribute to the damping of the motor under these conditions.

Thus there will be no rotation of the motor 60 under the conditions assumed above which indicate that there is no input signal for requiring rotation of the motor.

Assuming now that a signal $e_s$ is applied to the input winding 20 of the input signal transformer 22 at a short interval of time prior to that time being considered in this analysis, then the initial flux level established in the cores 40 and 42 will be a consequence of the D.-C. transistor quiescent current plus the voltage time integral of the amplified signal appearing across the control winding of the core during the previous half cycle of control time.

A study of the phasing of the control windings 36 and 38 wherein the dot marking indicates like phasing shows that a signal having given phase relation with respect to the magnetic amplifier excitation voltage $E_{48-50}$ will tend to advance the point of saturation which will be hereinafter described as the firing angle of one core and retard the firing angle of the other core.

Thus, Figures 2*a* and 2*b* shows the conditions of cores 40 and 42 upon the appearance of an input signal $e_s$. Figure 2*a* shows the core 40 as having its initial magnetization $\phi_2$ increased above its normal value $\phi_1$ (see Figure 2), while core 42 has its initial magnetization $\phi_3$ of Figure 2*b* decreased below its normal initial magnetization $\phi_1$ of Figure 2.

Figure 3A:
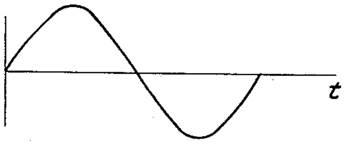
Figure 3B:
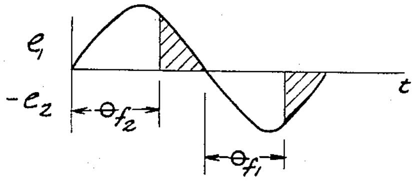
Figure 3C:
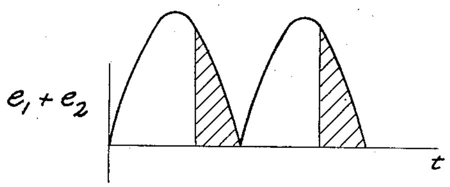
Figure 3D:
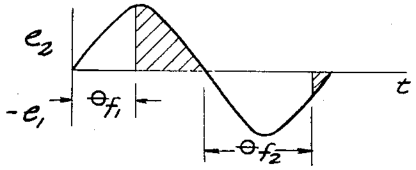

Figure 3*d* illustrates the voltage across windings 52 and 54 under the conditions of Figures 2*a* and 2*b* wherein the flux of one core has been increased a lesser amount during the previous half cycle so as to give an earlier firing angle $\theta_{f1}$ while the flux of the other coil has been sufficiently reduced during the previous half cycle so as to delay the firing point to an angle $\theta_{f2}$.

More specifically, Figure 3*d* shows the advance and retarding of the respective firing angles of the cores as being approximately $\frac{1}{2}\pi$ radians.

Figure 3E:
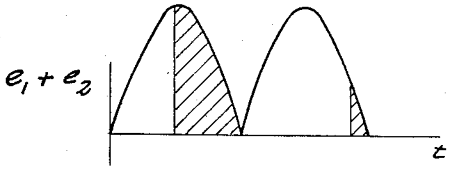

Figure 3*e* then shows the resulting motor potential across the control winding portions 52 and 54, and it is apparent in Figure 3*e* that a fundamental component of voltage is produced having a fixed phase relationship with respect to the input voltage $E_{48-50}$, the magnitude of this fundamental component depending upon the change in firing angle of the magnetic cores which is in turn determined by the excursion of the signal voltage from some predetermined value.

Figure 3F:
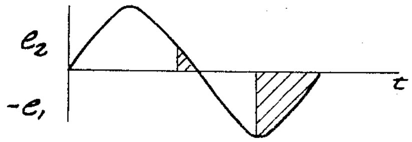
Figure 3G:
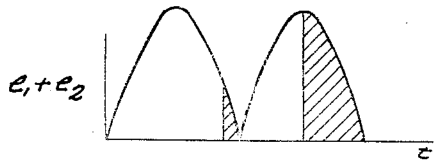

Figures 3*f* and 3*g* illustrate conditions similar to that of Figs. 3*d* and 3*e* wherein the input voltage is phase shifted by 180°.

Clearly, the resultant voltage as shown in Figure 3*g* which appears across windings 52 and 54 will have its fundamental voltage component phase shifted by 180° from the fundamental voltage component of Figure 3*d* whereby torque induced in motor 60 is in an opposite direction to that induced by energization in accordance with the conditions of Figure 3*d*.

Thus, it is seen that I have provided a novel transistor driven magnetic amplifier wherein the output of the magnetic amplifier has the phase of its fundamental output component and the magnitude thereof dependent upon the polarity of the input signal and the excursion of that signal by predetermined value, respectively.

In a similar manner, while I have shown the amplifier load as being a servo motor, it will be obvious to those skilled in the art that the output of the amplifier could have been applied to any of the many well-known applications.

As has been heretofore described, it is desirable that the circuit of Figure 1 be operable under a wide range of temperature variation even though the temperature variation alters the characteristics of transistor 26 and the magnetic cores 40 and 42 of the magnetic amplifier.

I have found that I can obtain very accurate temperature compensation for the complete device by constructing resistor 28 to vary its resistance with a change in temperature so that the collector circuit current will be over-compensated.

Thus when the temperature increases and the collector circuit current increases, resistor 28 simultaneously changes its resistance value in such a way that the emitter-base bias varies to decrease the collector circuit current below its normal quiescent value.

It is necessary that this over-compensation takes place since the coercive force of cores 40 and 42 as is seen in Figure 2 will decrease in magnitude when the temperature increases. By way of example, the coercive force has been plotted in Figure 2 for temperature conditions of minus 60° Fahrenheit, 60° Fahrenheit, and 180° Fahrenheit.

Thus assuming that the temperature has increased from 60° Fahrenheit to 180° Fahrenheit, it is clear that if the same flux change is required of either core 40 or 42, then the collector current through their control windings must be accurately adjusted and, in fact, must be decreased when the temperature increases and must be increased when the temperature decreases.

Thus I provide resistor 28 with a resistance temperature characteristic that will effect this desired change in magnetizing current.

That is to say, when the temperature changes from $T_1$ to $T_2$, the collector circuit current changes as seen in Figure 4 from $i_1$ to $i_2$ whereby a constant initial flux density $\phi_1$ is maintained.

Hence the over-all amplifying unit may now be accurately compensated over a wide range of temperature variation by allowing over-compensation through the simple coupling between the transistor amplifier and the magnetic amplifier in Figure 1.

In the foregoing the invention has been described solely in connection with specific illustrative embodiments thereof. Since many variations and modifications of the invention will not be obvious to those skilled in the art, it is preferred to be bound not by the specific disclosure herein contained but only by the appended claims.

I claim:

1. A transistor driven magnetic amplifier comprising a transistor amplifier having an input circuit and an output collector circuit and a magnetic amplifier having control windings and output windings, said control windings being connected directly in said collector circuit for coupling said transistor amplifier and said magnetic amplifier; said transistor amplifier having temperature compensating means connected in circuit relation with respect thereto for varying collector current in said collector circuit responsive to temperature change, said temperature compensating means being constructed to over-compensate said collector current by a magnitude to maintain a substantially constant initial magnetization in the magnetic cores of said magnetic amplifier.

2. In an amplifying device comprising a transistor amplifier coupled to a magnetic amplifier; a temperature compensating means for maintaining a substantially constant output for said magnetic amplifier over a predetermined temperature range, said temperature compensating means comprising a temperature responsive component connected in circuit relation with respect to said transistor amplifier to control the current in the collector circuit of said transistor amplifier, said temperature responsive component being constructed to over-compensate for current changes in said collector circuit due to temperature change by a magnitude sufficient to maintain a substantially constant initial magnetization in the magnetic cores of said magnetic amplifier.

3. In an amplifying device comprising a transistor amplifier coupled to a magnetic amplifier; a temperature compensating means for maintaining a substantially constant output for said magnetic amplifier over a predetermined temperature range, said temperature compensating means comprising a temperature responsive component connected in circuit relation with respect to said transistor amplifier to reduce the current in the transistor circuit below a quiescent value responsive to a temperature increase and to increase the current in the transistor circuit above said quiescent value responsive to a temperature decrease.

4. An amplifying device comprising a transistor amplifier and a magnetic amplifier; said magnetic amplifier comprising a first and second magnetic core, each of said first and second magnetic cores having a control winding and an output winding, said control windings being directly connected in the collector circuit of said transistor amplifier; said control windings being connected in series with one another, each of said output windings being connectable in series with an A.-C. source and a load, said magnetic amplifier controlling energization of said load responsive to input signals to said transistor amplifier; the net output of said first and second output windings which is a fundamental component of the frequency of said A.-C. source being determined in phase and magnitude by the phase relationship and excursion from a predetermined value of the input signal to said transistor amplifier with respect to said A.-C. source; a temperature compensating means for maintaining a substantially constant output for said magnetic amplifier over a predetermined temperature range, said temperature compensating means comprising a temperature responsive component connected in circuit relation with respect to said transistor amplifier to control the current in the collector circuit of said transistor amplifier, said temperature responsive component being constructed to overcompensate for current changes in said collector circuit due to temperature change by a magnitude sufficient to maintain a substantially constant initial magnetization in the magnetic cores of said magnetic amplifier.

5. An amplifying device comprising a transistor amplifier and a magnetic amplifier; said magnetic amplifier comprising a first and second magnetic core, each of said first and second magnetic cores having a control winding and an output winding, said control windings being directly connected in the collector circuit of said transistor amplifier; said control windings being connected in series with one another, each of said output windings being connectable in series with an A.-C. source and a load, said magnetic amplifier controlling energization of said load responsive to input signals to said transistor amplifier; the net output of said first and second output windings which is a fundamental component of the frequency of said A.-C. source being determined in phase and magnitude by the phase relationship and excursion from a predetermined value of the input signal to said transistor amplifier with respect to said A.-C. source; and temperature compensating means comprising a temperature responsive component connected in circuit relation with respect to said transistor circuit for maintaining a relatively constant output to said load regardless of temperature variation throughout a predetermined range; and said load comprising a first and second portion of a tapped control winding of a two phase motor; said first output winding being connected to energize said first portion, said second output winding being connected to energize said second portion; said motor comprising a further winding having a fixed phase energization; the rotor of said rotor rotating in one direction responsive to a first phase relation between said winding having fixed phase energization and fundamental output component and rotating in an opposite direction when said phase relation is reversed.

References Cited in the file of this patent

UNITED STATES PATENTS

| | | |
|---|---|---|
| 2,695,381 | Darling | Nov. 23, 1954 |
| 2,725,521 | Geyger | Nov. 29, 1955 |
| 2,790,127 | Hamilton | Apr. 23, 1957 |
| 2,793,336 | Geyger | May 21, 1957 |

OTHER REFERENCES

"Transistor Control of Magnetic Amplifiers," by G. F. Pitman, February 1954, Radio-Electronic Engineering, pp. 13–15.

"A Survey of Magnetic Amplifiers," by Carroll W. Lufcy, April 1955, Proceedings of IRE, pp. 404, 410.